Figure 1:
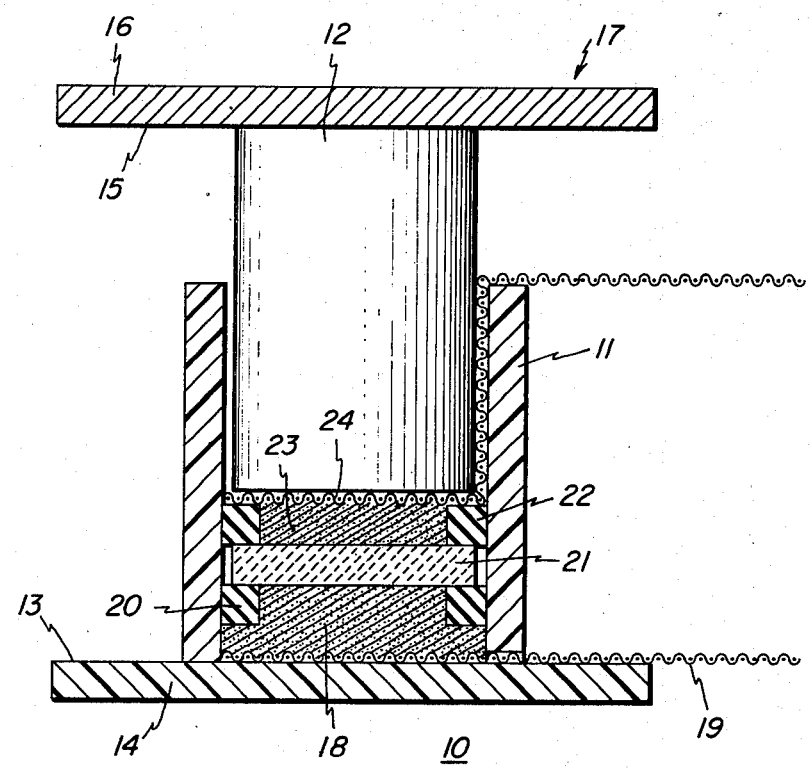

United States Patent [19]
Roth et al.

[11] 3,970,473
[45] July 20, 1976

[54] SOLID STATE ELECTROCHEMICAL CELL

[75] Inventors: Walter L. Roth, Schenectady; Gregory C. Farrington, Elnora, both of N.Y.

[73] Assignee: General Electric Company, Schenectady, N.Y.

[22] Filed: June 12, 1975

[21] Appl. No.: 586,220

[52] U.S. Cl. .............................. 136/83 R; 136/20; 136/153
[51] Int. Cl.² ........................................ H01M 4/36
[58] Field of Search ................... 136/83 R, 153, 20

[56] References Cited
UNITED STATES PATENTS
3,713,897  1/1973  Liang................................. 136/153

OTHER PUBLICATIONS
Progress in Solid State Chemistry, No. 7, 1972, pp. 149–151, Pergamon Press, Reiss & McCaldin.
Journal of Solid State Chemistry, 1, pp. 339–348, 1970.

Primary Examiner—John H. Mack
Assistant Examiner—C. F. LeFevour
Attorney, Agent, or Firm—Paul R. Webb; Joseph T. Cohen; Jerome C. Squillaro

[57] ABSTRACT

A solid state electrochemical cell is described which comprises a casing, an anode positioned within the casing, the anode selected from the class consisting of lithium, lithium as an amalgam, or alloys of lithium with indium or thallium, a cathode positioned within the casing, the cathode comprising a non-stoichiometric lithium compound in which the composition can be expressed by the formula $Li_xM_yO_z$ wherein the subscript $x$ is in the range $0<x<1$, M is a cation which can change its oxidation state in accordance with the value of $x$, the subscript $y$ is in the range $0<y \leq 3$, and $z$ has a value such that electrical neutrality of the compound is established, and a solid lithium-sodium aluminate electrolyte positioned within the casing between the anode and cathode and in contact with both the anode and cathode, the solid lithium-sodium aluminate electrolyte having an approximate composition of $LiNaO.9Al_2O_3$ of which 1.3 to 85.0% of the total alkali ion content is lithium.

3 Claims, 2 Drawing Figures

SOLID STATE ELECTROCHEMICAL CELL

This invention relates to solid state electrochemical cells and, moe particularly, to such cells employing a lithium type anode, a non-stoichiometric lithium compound cathode, and a solid lithium-sodium aluminate electrolyte.

Cross-reference is made to copending U.S. Pat. applications Ser. Nos. 517,511, 517,512 and 517,513 filed Oct. 24, 1974 in the names of Gregory C. Farrington and Walter L. Roth and entitled "Sealed Lithium-Bromine Cell," "Sealed Lithium-Iodine Cell," and "Sealed Lithium-Chlorine Cell," respectively. Cross-reference is made to copending U.S. Pat. application Ser. Nos. 557,583 and 557,584 filed Mar. 12, 1975 in the names of Walter L. Roth and Gregory C. Farrington and entitled "Sealed Lithium-Reducible Phosphorous Oxyhalide Cell" and "Sealed Lithium-Reducible Sulfur Oxyhalide Cell," respectively. Cross-reference is made to copending U.S. Pat. applications Ser. No. 559,901 and 559,990 filed Mar. 19, 1975 in the names of Walter L. Roth and Gregory C. Farrington and entitled "Sealed Lithium-Reducible Gas Cell" and "Sealed Lithium-Sulfur Monochloride Cell," respectively. Cross-reference is made to copending U.S. Pat. applications Ser. Nos. 571,500 and 571,556 filed Apr. 25, 1975 in the names of Gregory C. Farrington and Walter L. Roth and entitled "Sealed Lithium-Phosphorous Cell" and "Sealed Lithium-Sulfur Cell," respectively. Cross-reference is made to copending Pat. application, Ser. No. 572,258 filed Apr. 28, 1975 in the names of Walter L. Roth and Gregory C. Farrington and entitled "Sealed Lithium-Reducible Metal Salt Cell." And of the above copending applications are assigned to the same assignee as the present application.

In Liang U.S. Pat. 3,713,897, there are described electrolyte materials for high voltage solid electrolyte battery systems. This patent describes a solid ion-conductive electrolyte material containing lithium iodide, lithium hydroxide and aluminum oxide. This patent does not describe or teach a solid ceramic electrolyte. The present electrolyte is not prone to destruction in nonaqueous solvents as opposed to the Liang paten material.

In "Progress in Solid State Chemistry," No. 7, edited by A. Reiss and J. O. McCaldin, published by Pergamon Press in 1972, there is a Section 5 entitled "$\beta$-Alumina Electrolytes" comprising pages 141–175. This Section 5 was authored by J. T. Kummer of the Ford Motor Company. Of particular interest in Section 5 are pages 149–151. On page 149, FIG. 7, equilibria are shown between $\beta$-alumina and various binary nitrate melts containing $NaNO_3$ and another metal nitrate at 300°–350°C. It will be noted from FIG. 7 that the equilibration of sodium beta-alumina with molten $LiNO_3$ results in the partial replacement of 50 percent of the sodium ion content by lithium ions. On page 151 it is discussed in lines 1–5 that the equilibration of sodium beta-alumina with molten $LiNO_3$ does not produce a complete replacement of sodium ions by lithium ions. However, it is further pointed out that complete lithium ion replacement of sodium ion in sodium beta-alumina can be effected by first exchanging sodium ions by silver ions and then silver ions by lithium ions in a melt of $LiNO_3$-LiCl. Throughout the above Kummer publication there is no recognition that the lithium-sodium $\beta$-alumina produced by equilibration of sodium beta-alumina with molten $LiNO_3$ is a unique and stable compound which can readily transport lithium ions without substantially altering its content of sodium ions.

In the "Journal of Solid State Chemistry" 1, pages 339–348 (1970), there is an article entitled "Structure of the $M_xV_2O_5$-$\beta$ and $M_xV_2$-$_yT_yO_5$-$\beta$ Phases" by J. Galy et al. which discusses the structure of some non-stoichiometric lithium compounds. There is no discussion or recognition that such stoichiometric lithium compounds can be employed as cathodes in solid state electrochemical batteries.

Our present invention is directed to a solid state electrochemical cell employing a lithium type anode, a non-stoichiometric lithium compound cathode, and a solid lithium-sodium aluminate electrolyte.

The primary object of our invention is to provide a solid state electrochemical cell which has high reliability, long shelf life, high energy density, and a wide range of operating temperatures.

In accordance with one aspect of our invention, a solid state electrochemical cell employs a lithium type anode, a non-stoichiometric lithium compound cathode, and a solid lithium-sodium aluminate electrolyte which is a lithium ion conductor therebetween.

Figure 2:
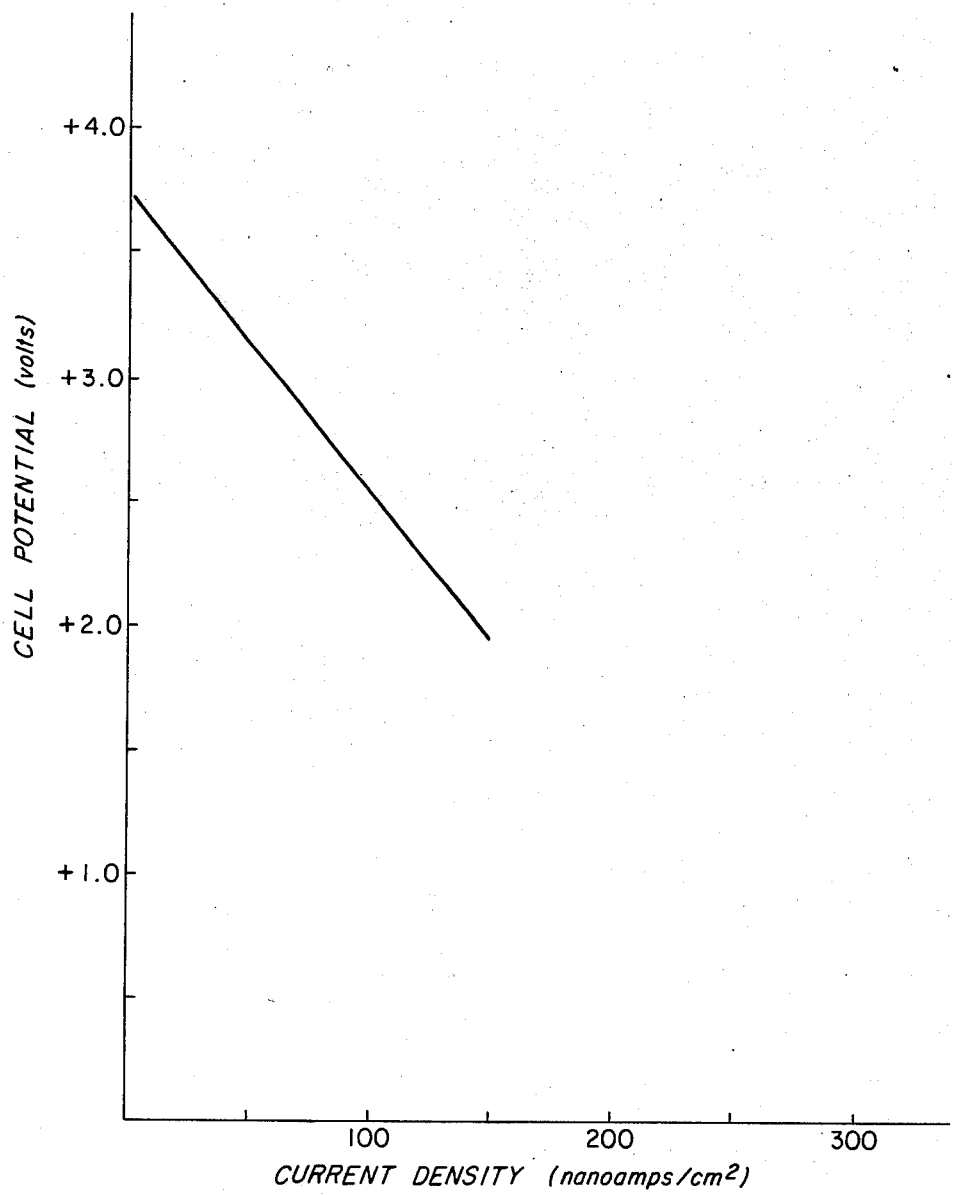

These and various other objects, features and advantages of the invention will be better understood from the following description taken in connection with the accompanying drawing in which:

FIG. 1 is a sectional view of a solid state electrochemical cell made in accordance with our invention and FIG. 2 is a polarization curve showing cell preformance of the cell shown in FIG. 1 at 26°C.

In FIG. 1 of the drawing, there is shown generally at 10 a solid state electrochemical cell embodying our invention. The cell has a plastic tube 11 and a solid plastic rod 12 inserted in the upper end of the tube 11. The lower end of tube 11 is adjacent to the inner surface 13 of plastic plate 14. The upper end of rod 12 is in contact with the inner surface 15 of plate 16 of vise 17. The remainder of vise 17 is not shown in the drawing. At the lower end of the tube is positioned a cathode 18 of a non-stoichiometric lithium compound with a cation valence of $x$ where $0 < x < 1$. Cathode 18 is in the form of $Li_{.33}V_2O_5$ powder pressed into a soft nickel mesh screen lead 19 which is positioned on upper surface 13 of plastic plate 14 between the lower end of tube 11 and plate 14. Screen lead 19 extends externally of tube 11. A silicone rubber washer 20 is pressed into the upper surface of cathode 18. A solid lithium-sodium aluminate electrolyte 21 in the form of a disc is positioned against the upper surface of washer 20 and in contact with the upper surface of cathode 18. A silicone washer 22 is positioned on the upper surface of electrolyte 21. A lithium anode 23 in the form of lithium metal powder is pressed against and in contact with the upper surface of electrolyte 21 and against and in contact with the inner periphery of washer 22. A soft nickel mesh screen Lead 24 is pressed into the upper surface of anode 23 and against the upper surface of washer 22. Solid plastic rod 12 is positioned against screen lead 24 which extends upwardly in tube 11 between rod 12 and tube 11 and extends then externally of tube 11. Plate 16 of vise 17 holds cell 10 together.

In FIG. 2, performance of the cell shown in FIG. 1 is provided by a polarization curve at a temperature of 26°C. In this FIG. 2, cell voltage in volts is plotted against current density in nanoamperes per square centimeter. We found that we could form a solid state electrochemical cell with a lithium ion-conductive electrolyte by positioning a plastic plate 14 on a surface, such as a workbench. Tube 11 has its lower portion positioned on the upper surface of plate 14. Prior to positioning tube 11 on plate 14, a nickel screen lead 19 is placed under tube 11 and extends externally therefrom to provide an electrical lead. Lithium vanadate in the form of $Li_{.33}V_2O_5$ powder is placed in tube 11 adjacent its lower portion and in contact with nickel screen 19. Silicone washer 20 is then positioned on the upper surface of the powder. Rod 12 is inserted in the upper end of tube 11 and pressed against the upper surface of the powder 18 and washer 20. Vise 17 is tightened to press powder 18 into nickel screen lead 19 and to press washer 20 into the upper surface of the pressed powder. In this manner the upper surface of pressed powder 18 is flush with the upper surface of washer 20. Vise 17 was loosened and rod 12 removed Electrolyte 21 in the form of a disc was positioned on the upper surface of a washer 20 and in contact with the upper surface of pressed powder 18. A similar washer 22 was then positioned on the upper surface of electrolyte 21. Lithium metal 23 in the form of powder was placed within tube 11 and generally within washer 22. A soft nickel mesh screen lead 24 is positioned against the upper surfaces of lithium metal powder 23 and washer 22 and extended upwardly in tube 11 against its inner surface and extended externally of tube 11. Rod 12 was then inserted in the upper end of tube 11 and pressed against the upper surfaces of powder 23, nickel screen lead 24, and washer 22. A portion of lead 24 is located between tube 11 and rod 12 and another portion of lead 24 extended externally of tube 11. Vise 17 was tightened to press nickel screen lead 24 into powder 23 and to press powder 23. The resulting device is a solid state electrochemical cell made in accordance with our invention.

It will be appreciated that various other configurations and material can be used for the casing. Other materials can be substituted for the silicone washers. If desired, in the cell configuration, the solid electrolyte disc could be sealed by glass seals to the casing to separate the cathode from the anode as shown, for example, in above-mentioned U.S. Pat. No. 3,817,790.

For the anode we can employ lithium, lithium as an amalgam or alloys of lithium with indium or thallium. For the cathode we employ a non-stoichiometric lithium compound in which the composition can be expressed by the formula $Li_xM_yO_z$ wherein the subscript $x$ is in the range of $0<x<1$, M is a cation which can change its oxidation state in accordance with the value of $x$, the subscript $y$ is in the range $0<y$ 3, and $z$ has a value such that electrical neutrality of the compound is established. We employ a solid lithium-sodium aluminate electrolyte between the cathode and anode to provide a solid barrier preventing contact between the electrodes and to provide lithium ion conductivity. The solid lithium-sodium ion-conductive electrolyte has an approximate composition of $LiNa0.9Al_2O_3$ of which 40 to 60 percent of the total alkali content is lithium. As it was discussed above in "Progress in Solid State Chemistry," J. T. Kummer, in Section 5 is described a lithium-sodium, $\beta$-alumina material, particularly on pages 149–151. Further, it is described in the article how to manufacture such material. As it will be particularly noted throughout the above Kummer publication, there is no recognition that the lithium-sodium $\beta$-alumina produced by equilibration of sodium beta-alumina with molten $LiNO_3$ is a unique and stable compound which can readily transport lithium ions. We used such material containing 50 percent lithium ions as a solid electrolyte in the cell shown in FIG. 1 and described above. The results of performance of this cell is shown in FIG. 2. Such electrolyte material containing 50 percent lithium ions appears to be the optimum amount of lithium ions in the material.

A range of 40 to 60 percent lithium ions in the electrolyte material with the remainder sodium ions provides the desirable conductivity for the operation of our cells. Further, the desirable conductivity necessary for the operation of our cell can be obtained by employing a broader range of 1.3 to 85 percent lithium ions in the electrolyte material with the remainder sodium ions.

We found that for the cathode we could employ a non-stoichiometric lithium compound in which the composition can be expressed by the formula $Li_xM_yO_z$ wherein the subscript x is in the range of $0<x<1$, M is a cation which can change its oxidation state in accordance with the value of $x$, the subscript y is in the range $0<y$ 3, and z has a value such that electrical neutrality of the compound is established. Suitable cathodes include the so-called lithium bronzes with formula $Li_xV_2O_5$ or $Li_2V_2{-}_x{}^{5+}V_x{}^{4+}O_5$ which are such non-stoichiometric compounds. The compounds include $Li_{0.04}V_2O_5$, $Li_{0.30}V_2O_5$ and $Li_{0.33}V_2O_5$. Several phases have been identified over this composition range which are similar structures with $Li^+$ ions occupying tunnels. Charge is compensated by adjustment of the $V^{5+}/V^{4+}$ ratio for different concentrations of $Li^+$. Other suitable cathodes can be non-stoichiometric lithium compounds with the same formula, such as, $Li_{0.1}Ta_{1.9}O_{4.8}$, $Li_{0.005}WO_3$, $Li_{0.47}WO_3$, and $Li_{0.31}MoO_3$.

An example of a solid state electrochemical cell made in accordance with our invention is set forth below:

EXAMPLE I

A cell was assembled as generally described above and shown in FIG. 1 of the drawing. A lithium-sodium aluminate electrolyte disc was made by first preparing a cylinder of $\beta$-alumina by firing $Na_2O+Al_2O_3$ plus 1 percent MgO at 1,750°C. The density of the $\beta$-alumina cylinder was 3,224 g/cm$^3$ corresponding to less than 1 percent void volume. A disc of 1 mm in thickness was sliced from the cylinder and converted to a lithium-sodium aluminate electrolyte by immersion in molten $LiNO_3$ at 400°C for 24 hours. The exchange of the sodium ions for the lithium ions was accompanied by a 1.91 percent decrease in weight and the final density was 3.148 g/cm$^3$. X-ray diffraction showed that the electrolyte disc has a hexagonal crystal structure with lattice parameters a = 5.603 ±0.001 A and c = 22.648 ± 0.003 A.

EXAMPLE I

A plastic plate was positioned on a surface. A plastic tube at its lower portions was positioned on the upper surface of the plaste. Prior to positioning the tube on the plate, a nickel screen lead was placed under the tube and extended externally therefrom to provide an electrical lead. Lithium vanadate in the form of $Li_{0.33}V_2O_5$ powder was placed in the tube adjacent its lower portion and in contact with the nickel screen. A silicone washer was then positioned on the upper surface of the powder. A solid plastic rod was inserted in the upper end of the tube and pressed against the upper surface of the powder and the washer. The inner surface of the plate of a vise was tightened against the end of the solid plastic rod to press the powder into the nickel screen lead and to press the washer into the upper surface of the pressed powder. The resulting upper surface of the pressed powder was flush with the upper surface of the washer. The vise was loosened and the rod was removed from the tube. The above described electrolyte in disc form was positioned on the upper surface of the washer and in contact with the upper surface of the pressed powder. A similar washer was then positioned on the upper surface of the electrolyte disc. Lithium metal in the form of powder was placed within the tube and generally within the washer. A soft nickel mesh screen lead was positioned against the upper surfaces of the lithium metal powder and the upper washer and extended upwardly in the tube against its inner surface and extended externally of the tube. The rod was then inserted in the upper end of the tube and pressed against the upper surfaces of the lithium powder, the second nickel screen lead and the second washer. A portion of the lead was located between the tube and the rod and another portion of the lead extended externally of the tube. Vise 17 was tightened to assert pressure against the end of the rod thereby pressing the nickel screen lead into the lithium powder and pressing the powder. The resulting device was a solid state electrochemical cell made in accordance with our invention.

EXAMPLE II

The performance of the cell of Example I is shown in the polarization curve in FIG. 2 of the drawing. The cell voltage in volts is plotted against current in nanoamperes per square centimeter at a temperature of 26°C.

While other modifications of the invention and variations thereof which may be employed within the scope of the invention have not been described, the invention is intended to include such as may be embraced within the following claims.

What we claim as new and desire to secure by Letters Patent of the United States is

1. A solid state electrochemical cell comprises a casing, an anode positioned within the casing, the anode selected from the class consisting of lithium, lithium as an amalgam or alloys of lithium with indium or thallium, a cathode positioned within the casing, the cathode comprising a non-stoichiometric lithium compound in which the composition can be expressed by the formula $Li_xM_yO_z$ wherein the subscript $x$ is in the range $0<x<1$, M is a cation which can change its oxidation state in accordance with the value of $x$, the subscript $y$ is in the range $0<y \leq 3$, and $z$ has a value such that electrical neutrality of the compound is established, and a solid lithium-sodium aluminated electrolyte positioned within the casing between the anode and cathode, the solid lithium-sodium aluminate electrolyte having an approximate composition of $LiNaO \cdot 9Al_2O_3$ of which 1.3 to 85.0 percent of the total alkali ion content is lithium.

2. A solid state electrochemical cell as in claim 1, in which 50 percent of the total alkali content of the solid lithium-sodium aluminate electrolyte composition is lithium.

3. A solid state electrochemical cell as in claim 1, in which the cathode is lithium vandadate, $Li_{0.33}V_2O_5$.

\* \* \* \* \*